United States Patent [19]

Furrer et al.

[11] Patent Number: 5,112,919
[45] Date of Patent: May 12, 1992

[54] SOLID FEEDING OF SILANE CROSSLINKING AGENTS INTO EXTRUDER

[75] Inventors: Willy Furrer, Gingins; Jacques J. F. J. Schombourg, Commugny, both of Switzerland

[73] Assignee: Union Carbide Chemicals & Plastics Technology Corporation, Danbury, Conn.

[21] Appl. No.: 429,206

[22] Filed: Oct. 30, 1989

[51] Int. Cl.$^5$ ............................................. C08F 255/00
[52] U.S. Cl. .................................... 525/263; 525/244; 525/288
[58] Field of Search ................. 525/72, 288, 263, 106

[56] References Cited

U.S. PATENT DOCUMENTS

| | | | |
|---|---|---|---|
| 3,646,255 | 2/1972 | Scott | 260/27 |
| 4,117,195 | 9/1978 | Swarbrick et al. | 428/379 |
| 4,247,498 | 1/1981 | Castro | 264/41 |
| 4,379,860 | 4/1983 | Fickel | 521/61 |
| 4,647,630 | 3/1987 | Schmid | 525/431 |
| 4,707,517 | 11/1987 | Bullen et al. | 525/72 |
| 4,783,511 | 11/1988 | Schmid | 525/431 |

FOREIGN PATENT DOCUMENTS 0172650 2/1986 European Pat. Off. .
2187464 3/1986 United Kingdom .

OTHER PUBLICATIONS

Chem Abstract, vol. 96, No. 14, Apr. 1982, Columbus, Ohio, U.S.; abstract No. 105184Y, p. 32; & JP-A-56 155 213 (Chisso Corp) Jan. 12, 1981.
Chem Abstract, vol 100, No. 10, Mar. 1984, Columbus, Ohio, U.S.; abstract No. 69488R, p. 52; & JP-A-58 117 245 (Chisso Corp) Dec. 7, 1983.

Primary Examiner—Melvyn I. Marquis
Assistant Examiner—D. E. Aylward
Attorney, Agent, or Firm—William F. Gray

[57] ABSTRACT

A process for producing a polymer crosslinkable by exposure to moisture in the presence of a hydrolysis/condensation catalyst comprising blending (i) a thermoplastic base polymer, (ii) a solid carrier polymer containing a silane, and (iii) a free radical generator; heating and mixing (i), (ii) and (iii) together at a temperature above the crystalline melting point of said base polymer; optionally, a free-radical generator, hydrolysis/condensation catalyst, and other additives are contained in the solid carrier polymer.

29 Claims, No Drawings

SOLID FEEDING OF SILANE CROSSLINKING AGENTS INTO EXTRUDER

BACKGROUND OF THE INVENTION

1. Field of the Invention

This invention relates to a process for crosslinking polymers (including homopolymers and copolymers) and to the crosslinked polymeric products obtained. More particularly, the present invention relates to a process for silane crosslinking wherein the silane is fed into an extruder in a solid form.

2. Description of the Prior Art

The properties of polymers can be modified by crosslinking of the polymer chains. One method for crosslinking which is commonly used in the industry is known as "silane crosslinking", i.e., crosslinking using olefinically unsaturated alkoxysilanes. This method involves at least two stages. In the first stage, a silane is grafted onto base polymer chains in the presence of a free radical generator (e.g. peroxide catalyst) and in a second stage, crosslinking of the polymer chains occurs through the formation of Si-O-Si bonds as bridges. To effect crosslinking, the intermediate formed by grafting is subjected to moisture, for example, hot water or steam, in the presence of a hydrolysis/condensation catalyst. Two processes most often employed are (1) a two-step Sioplas TM process as taught in U.S. Pat. No. 3,646,155 and (2) a Monosil TM one-step process as taught in U.S. Pat. No. 4,117,195.

A problem associated with both the Sioplas TM process and the Monosil TM process methods is the difficulty of adequately combining some or all of the silane, peroxide catalyst and hydrolysis/condensation catalyst (some or all of which are liquids) with the base polymer which is a solid. If the silane is injected as a liquid stream into a conventional extruder and mixed with a polymer, small gels form throughout the polymer product, apparently because of localized, premature crosslinking in areas of high additive (silane and catalyst) concentration resulting from inadequate mixing.

When a silane is sprayed into a polymer, additional apparatus is required, and the silane must be sprayed uniformly. High demands are placed on the uniformity of mixing at or near the spraying point to equalize variations in concentration and ensure that the silane is distributed homogeneously.

To prevent localized, premature crosslinking in areas of high additive concentration and to equalize variations in concentration at or near the point where the silane and peroxide are introduced, a long extruder, e.g. such as the one taught in U.S. Pat. No. 4,117,195 may be employed. Furthermore, introducing the silane as a liquid into the conveying section of an extruder typically results in slippage and poor metering. The use of a long extruder also improves metering in such cases.

U.S. Pat. No. 4,247,498 describes microporous products and a method for making microporous products which can absorb relatively large amounts of "functionally useful liquids" and still behave as solids. The microporous products are made from synthetic thermoplastic polymers and "compatible liquids." In the course of producing the products, some of the compatible liquids are removed. The compatible liquids may also be functionally useful liquids and, when they are, the liquid remaining in the product permits the product to be used directly. A variety of such dual purpose liquids are disclosed at Column 27, line 62 to Column 28, line 32. Table VIII in this patent illustrates the formation of homogeneous porous polymer intermediates from polypropylene and compatible liquids. Footnote (1) suggests that phenylmethyl polysiloxane was used as a compatible liquid. However, this patent does not mention using silane crosslinkers.

U.S. Pat. No. 4,783,511 describes a process for the preparation of molded bodies from dry thermoplastic polyamides which have improved mechanical properties and higher shape-stability than the polyamide starting materials. The process involves adding to the dry polyamide a masterbatch containing a silane and a "substrate" (i.e., a polyolefin, a swellable material or a non-swellable thermoplast sponge) before processing the dry polyamide. Three methods of masterbatch preparation described in the patent (Column 3, lines 11 ff.) are summarized as follows:

(1) A melt of a polyolefin is mixed with the silane and the silane-containing melt is drawn off as a cord which is comminuted to give a granulate which is carefully dried.

(2) A silane-swellable particulate carrier material (for example, in the form of crumbs, grains or a coarse powder) is contacted with the silane, so that the silane is directly absorbed on the carrier. The carrier must remain sprayable, i.e., there should be no adhesion of the powder particulate.

(3) A thermoplast, which is in the form of a sponge with open pores but which has no swellability with respect to the silane, is mixed with the maximum amount of silane sufficient to fill the pores. The sprayability of the thermoplast should be essentially unchanged.

OBJECTIVES

An object of the present invention is to provide a means for the convenient introduction of the silane crosslinker into a polymer.

Another object of the present invention is to avoid slipping problems during extrusion of crosslinkable polymer.

Still another object of the present invention is to allow a silane crosslinker to be handled as a dry solid, i.e., capable of being dry fed into a mixing or compounding apparatus.

A further object of the present invention is to allow for use in a standard-length extruder employed in the industry for grafting a silane onto a polymer.

An additional object of the present invention is to improve the physical properties of a fabricated product.

Yet another object of the present invention is to reduce start-up time of the extrusion of the crosslinkable polymer by simplifying calibration of the silane feeding system.

Other objects of the invention will become apparent from the description and examples which follow.

SUMMARY OF THE INVENTION

The present invention provides a process for crosslinking a base polymer with a silane where the silane has been introduced into (e.g., absorbed into or encapsulated by) a solid carrier polymer that is compatible with the base polymer. After the silane is introduced into the solid carrier polymer, the solid carrier polymer containing the silane is fed into the mixing apparatus where it is mixed with the base polymer. Subsequently, the mixture is exposed to moisture to effect crosslinking.

In a preferred embodiment, the silane is absorbed into a solid carrier polymer along with a free-radical generator, such as a peroxide, and/or a hydrolysis/condensation catalyst, usually a tin catalyst, are introduced into the mixing apparatus where it contacts the base polymer. In a most preferred embodiment other additives, such as stabilizers, metal deactivators, and the like are also introduced into the solid carrier polymer along with the silanes and the catalysts and subsequently mixed with the base polymer in the mixing device (e.g., an extruder).

DETAILED DESCRIPTION OF THE INVENTION

Base Polymer

The base polymer is the polymer to be modified by the process of the present invention. Such a base polymer is a thermoplastic polymer. The base polymer employed in the invention may be either a homopolymer of an alpha-olefin having 2 to 6 carbon atoms or a copolymer of two alpha-olefins, e.g., copolymers of ethylene; propylene; 1-butene; 1-pentene; 1-hexene; 1-octene; isobutylene; 2-methyl-1-butene; 3-methyl-1-butene; 2-methyl-1-pentene; 3-methyl-1-pentene; 4-methyl-1-pentene; 2,3-dimethyl-1-butene; 3,3-dimethyl-1-butene; and 2-ethyl-1-butene. Other polymers useful in this invention include ethylene vinyl acetate copolymer (EVA), ethylene alkyl acrylate copolymers such as ethylene ethylacrylate (EEA), and ethylene acrylic acid copolymer. Modified poly-alpha-olefins such as chlorinated polyethylene may also be useful in this invention. Mixtures of two or more base polymers may also be used.

The base polymer is added to the extruder as a solid, generally in pellet or granular form. Preferably the base polymer is polyethylene or a copolymer of ethylene and one of the above monomers. Most preferably, the base polymer is homopolymer of ethylene or a copolymer of ethylene with 1-butene, 1-hexene, 1-octene, or 4-methyl-1-pentene.

Silane

Silanes suitable for grafting onto and crosslinking with a base polymer according to the present invention include silanes of the general formula:

wherein: R' represents a hydrogen atom or methyl group; x and y are 0 or 1 with the proviso that when x is 1, y equals 1; n is an integer from 1 to 12 inclusive, preferably 1 to 4; and each R independently represents a hydrolyzable organic group such as an alkoxy group having 1 to 12 carbon atoms (e.g. methoxy, ethoxy, butoxy), aryloxy group (e.g. phenoxy), aralkoxy (e.g. benzyloxy), aliphatic acyloxy group having 1 to 12 carbon atoms (e.g. formyloxy, acetyloxy, propanoyloxy), oximo or substituted amino groups (alkylamino and arylamino), or a lower alkyl group having 1 to 6 carbon atoms inclusive, with the proviso that not more than one of the three R groups is an alkyl.

Some representative examples of the unsaturated silanes useful in the present process are vinyltriethoxysilane, vinyltrimethoxysilane, allyltriethoxysilane, vinyl-tri-n-butoxysilane, hexenyltri-iso-butoxysilane, allyltri-n-pentoxysilane, dodecenyltri-n-octoxysilane, heptenyltri-n-heptoxysilane, allyltri-isopropoxysilane, pentenyl-tri-n-propoxysilane, sec-butenyltriethoxysilane, and 3-methacryloxypropyl-trimethoxysilane.

Preferably the silanes used in the process of the present invention will contain a vinyl or methacryloxypropyl group as the group reacting with the free radical sites formed in the polymer by the free radical generator. These silanes are commercially available from Union Carbide Chemical and Plastics Company Inc., e.g. A-171, A-151, A-174. The most preferred silane is vinyl trimethoxysilane.

The amount of silane is chosen so as to be near the minimum amount needed to provide the desired degree of crosslinking. The proportion of hydrolyzable silane based on the weight of the base polymer, e.g., polyethylene, is not narrowly critical and can range from 0.1 to 10 wt. %, preferably 0.7 to 3 wt. %, of silane based on the total weight of polymer.

Carrier Polymer

Carrier polymers suitable for use in the present invention must be solids that are in particulate form and that are compatible with the polymer being crosslinked and the silane. By compatible is meant that the carrier polymer must not readily react with the silane and must be dispersible or soluble in the base polymer. Preferably suitable carrier polymers are non-hygroscopic, that is, absorption of moisture is comparatively low to minimize the possibility of premature hydrolysis and condensation of the silane. In any event, the carrier polymer should be substantially free of water. In general, carrier polymers of the present invention are particulates in the form of powder, granules, or pellets. A preferred form is pellet.

The carrier polymer must be capable of incorporating the silane crosslinker while still retaining its particulate and solid characteristics. The three classes of carrier polymers are porous, sponge-like carrier polymers, swellable polymers and encapsulates.

Porous polymers are capable of incorporating the silane in the pores. Porous sponge-like carrier polymers suitable for taking up silane may be prepared, for example, from various high and low density polyethylenes and polypropylenes. Preferred porous polymers for use in the present invention as carrier polymers include ethylene vinyl acetate copolymer (EVA), high density polyethylene, low density polyethylene and linear low density polyethylene. The pore size is small enough and the pore volume is large enough to hold a relatively large volume of silane. The pore volume is generally from about 10–90% preferably about 30–90%; the cross-section of the pores is generally in the range of 0.1–5μm and the cell size id generally from 1–30μm. These porous polymers can take up about 0.5 to about three times their weight of silane. The porous polymers may be employed as carrier polymers in powder, granular, or pellet form. However, the preferred form is pellet. Suitable porous polymers are commercially available and can be obtained from ENKA AG, Accurel Systems, Postfach, 8753 Obernberg, FRG, or prepared as taught in U.S. Pat. No. 4,247,498.

Swellable polymers are capable of incorporating the silane by being swelled by the silane. The carrier polymer may also be chosen from polymers that are readily swelled by the silane and optionally the peroxide, hydrolysis/condensation catalyst, stabilizers, and other additives where these can be mixed with or dissolved in the silane to form a liquid mixture. One polymer suitable for this purpose is EVA, especially EVA having a high vinyl acetate content ranging from about 18 to 45 percent by weight. Such a swellable carrier polymer may be used in granule, powder, pellet, or other solid form.

The carrier polymer should be chosen so that the amount of silane that it can absorb without becoming wet or sticky is a minimum of about 10% by weight. In practice it has been found that suitable swelled pellets containing about 20% vinyltrimethoxysilane can be prepared from EVA made from 26% vinyl acetate monomer. Polyethylene is not generally suitable as a swellable carrier polymer because it does not readily absorb sufficiently large amounts of silanes.

A third class of carrier polymer is an encapsulate. The silane is encapsulated, i.e., contained with a thermoplastic polymer capsule. Suitable polymers useful as encapsulates in the present invention are polyolefins. Suitable polyolefins may be either a homopolymer of an alpha-olefin having 2 to 6 carbon atoms or a copolymer of two alpha-olefins. For example, encapsulation of the silane in the carrier polymer would produce a suitable solid form of the silane.

The amount of carrier polymer is selected to be the minimum amount needed to contain the desired amount of silane and optionally other additives in a dry, easily handled form. Generally, the carrier polymer is employed in amounts ranging from 0.1 to about 20 weight percent, preferably, in amounts ranging from 0.7 to about 7 weight percent based on the weight of the extrudate.

Free-Radical Generator

The free radical generator used in the process of the present invention may be any compound that is capable of producing free radical sites in the base polymer, the reaction conditions depending on temperature and retention time needed for achieving a suitable half life time. Suitable free-radical initiators are organic peroxides and peresters such as tert-butylperoxypivalate, tert-butylperoxy-2-ethylhexanoate, dicumylperoxide, $\alpha,\alpha'$-bis (tert-butylperoxydiisopropyl)benzene, di-tert-butylperoxide, tert-butyl cumyl peroxide, di-benzoylperoxide, 2,5-dimethyl-2,5-bis (tert-butylperoxy) hexane, tert-butyl perbenzoate, and combinations thereof. Also an azo compound such as 2,2-azo-bis(2,4-dimethylvaleronitrile) and azo-bis-iso-butyronitrile may be used as a free radical generator in the present invention.

Most preferred free radical generators are the peroxides, especially dicumylperoxide and $\alpha,\alpha$-bis(tert-butylperoxy)di-isopropylbenzene.

The amount of free radical generator necessary in the present invention is not narrowly critical and can be varied over wide ranges, for example, from 0.01 wt. % to 0.4 wt. %, preferably 0.05 to 0.2 wt. %, based on the total weight of the extrudate, depending on the nature of the base polymer, the silane, the presence of stabilizers, the extrusion conditions and so forth.

The amount of free radical generator needed depends on the identity and purity of the specific peroxide. For example, if it were found that a 1.5% loading of pure dicumyl peroxide (5.87% active oxygen) were sufficient in a formulation, but it were desired to try 2,5-dimethyl-2,5-di (tert-butylperoxy)hexane, available as a 91% active liquid (10% active oxygen), then one might initially estimate that the proper amount of the latter peroxide would be only 1.5% $\times$ (5.87/10), or 0.88% in the formulation.

Hydrolysis/Condensation Catalyst

Hydrolysis/condensation catalysts used in the process of the present invention catalyze the crosslinking of the extrudate by reaction of the extrudate with water. The catalysts may accelerate either the hydrolysis reaction of the grafted silyl groups with water to form silanols, or the condensation of silanols to form Si-0-Si bonds, or both. These catalysts may be Lewis acids, such as metal carboxylates, for example: dibutyltin dilaurate, dioctyltin dilaurate, stannous acetate, stannous octoate, dibutyltin dioctoate, di-octyl tin-bis (isooctylmaleate), di-octyl-tin-bis (isooctylthioglycolate), as well as organometal compounds such as titanium esters and chelates, for example, tetrabutyl titanate, tetranonyl titanate, and bis (acetylacetonyl) di-isopropyl titanate; organic bases, such as, triethylamine, hexylamine, dibutylamine, and piperidine; and protic acids, such as, fatty acids and mineral acids. Preferred hydrolysis/condensation catalysts include dibutyltin dilaurate (DBTDL), dioctyltin dilaurate (DOTDL) and stannous octoate.

The proportion of silanol condensation catalyst used is not narrowly critical, illustratively ranging from 0.01 to 0.2 wt. %, preferably 0.02 to 0.1 wt. %, based on the total weight of the extrudate.

When it is desired to store the crosslinkable polymer for some time prior to fabrication and crosslinking, then a hydrolysis/condensation catalyst should normally not be added during the production of the crosslinkable polymer. Instead, the hydrolysis/condensation catalyst should be mixed with the crosslinkable polymer at the fabrication step. However, if it is desired to perform the production and fabrication of the crosslinkable polymer in a single step, then the hydrolysis/condensation catalyst should be included. An extruder would generally be used as the mixing compounding apparatus in this case.

Additives

In addition to the silane, catalyst and free radical generator, additives which are commonly utilized in crosslinking may also be employed in the process of the present invention. These include any of the antioxidants and heat stabilizers commonly used in the processing of base polymers and combinations thereof. In addition, minerals for improving flame retardancy or as an internal source of water for the crosslinking, e.g. alumina trihydrate, zeolites or mineral fillers like chalk, talc, mica, silica, silicates or carbon black may be used.

Generally, absorption of the silane, alone or with other additives in liquid form, into the carrier polymer in the process of the present invention is accomplished by tumble blending, the carrier polymer, silane, and, optionally, the other additives together. Tumble blending, for example, may be accomplished in a Conus blender. If not all additives are liquid, then any solid components should first be dissolved in the silane. The blending is carried out under a blanket of nitrogen, carbon dioxide, or dry air in a closed system to maintain the silane substantially free of water and to minimize evaporation of the liquid ingredients. Optionally, during blending heat may be applied. The container in which the blending takes place must be non-reactive with the silane and other additives. The absorption of silane and any other liquid additive into the carrier polymer is carried out prior to feeding the silane into the mixing or compounding apparatus. Additives absorbed into the carrier polymer along with the silane may be incorporated, for example, at 1 to 50 percent of the weight of the carrier polymer.

Temperature

In accordance with the process of this invention, the process temperature generally ranges above the crystalline melting point of the base polymer, i.e., between 120° C. and the degradation temperature of the polymer. Preferably, the temperature of the process ranges from 150° C. to 225° C. The actual processing temperature employed will normally be determined by consideration of polymers being processed and the type of apparatus in which the process is performed.

Apparatus

The process of the present invention may be carried out employing any suitable apparatus. Preferably, however, the process is carried out under conditions in which the base polymer and solid carrier polymer containing silane are subjected to mechanical working, such as kneading or compounding. The process is, therefore, carried out in, for example, an extruder. Common extruders are the single or twin screw type. Other apparatus that can be employed can include a Buss Cokneader or a Banbury mixer. Such compounding equipment may be preferred to an extruder where the grafting reaction is to be performed and then the crosslinked polymer is to be stored for a period of time prior to fabrication.

Whereas the exact scope of the present invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages shown in the following examples are by weight unless otherwise specified.

| DEFINITIONS | |
|---|---|
| LLDPE | linear low density polyethylene |
| LDPE | low density polyethylene |
| PE | polyethylene |
| HDPE | high density polyethylene |
| EVA | ethylene/vinyl acetate copolymer |

| LIST OF MATERIALS USED | |
|---|---|
| Material Name | Description |
| Silane 1 | Vinyltriethoxysilane, available from Union Carbide Chemicals and Plastics Company Inc. as A-151. |
| Silane 2 | Vinyltrimethoxysilane, available from Union Carbide Chemicals and Plastics Company Inc. as A-171. |
| BHT | 2,6-tert-butyl-4-methylphenol, a stabilizer |
| Compound A | 8% DICUP<br>88.95% Silane 1<br>3.0% DBTDL<br>0.5% BHT |
| Compound B | polyoxyethylene-grafted polydimethylsiloxane, a processing aid |
| Compound C | 40% Porous Polymer B<br>48.6% Silane 2<br>2.4% Compound B<br>2.4% Trigonox 101<br>0.49% DOTDL |
| Compound D | 4.3% Irganox 1010<br>1.8% Hostanox VPO SP1<br>74.87% Silane 2<br>5.33% DICUP<br>1.84% DBTDL<br>5.12% Compound B |
| Compound E | 5.15% Hostanox VPO SP1<br>7.69% Irganox 1076<br>75.5% Silane 2<br>5.2% DICUP<br>1.8% DBTDL<br>5.0% Compound B<br>12.5% Naugard 445 |
| Compound F | 90.9% Silane 2<br>3.64% Trigonox 101<br>4.55% Compound B<br>0.91% DOTDL |
| Compound G | 80.97% Silane 2<br>4.04% Compound B<br>4.04% Trigonox 101<br>0.81% DOTDL<br>7.08% Irganox 1010<br>3.06% Hostanox VPO SP1 |
| Compound H | 90.0% LLDPE (octene comonomer, 0.939 g/cm$^3$, MI 2.5)<br>2.5% Naugard XL-1<br>7.5% Ethanox 330 |
| Compound I | 40% Porous Polymer A<br>45% Silane 2<br>3.2% DICUP<br>1.1% DBTDL<br>3.1% Compound B<br>3.1% Hostanox VPO SP1<br>4.6% Irganox 1076 |
| Compound J | 40% Porous Polymer A<br>45.3% Silane 2<br>3.12% DICUP<br>1.08% DBTDL<br>3.0% Compound B<br>7.5% Naugard 445 |
| Compound K | 40% Porous Polymer A<br>54.54% Silane 2<br>2.18% Trigonox 101<br>2.73% Compound B<br>0.54% DOTDL |
| Compound L | 1.7 parts DICUP and 18.35 parts Silane 2 absorbed in 80 parts EVA-1 |
| Compound M | 1 part DBTDL absorbed in 99 parts PE-1 |
| Compound N | 60 parts Compound A absorbed in 40 parts Porous Polymer A |
| DBTDL | dibutyltin dilaurate, hydrolysis/condensation catalyst |
| DICUP | dicumyl peroxide |
| DOTDL | dioctyltin dilaurate, hydrolysis condensation catalyst |
| EVA-1 | EVA, 26% VA content, MI 2 known as Escorene 26.2 available from Exxon |
| Ethanox 330 | 1,2,,4-trimethyl-2,3,6-tris[3,5-di-tertiary-butyl -4-hydroxybenzyl] benzene, available from Ethyl Corp. |
| Hostanox VPOSP1 | tris[2-tert-butyl-4-thio(2'-methyl-4'-hydroxy-5'-tert-butyl)phenyl-5-methyl]phenyl phosphite from Hoeschst; a stabilizer |
| Irganox 1010 | tetra-bis-methylene 3-(3,5-di-tert-butyl-4-hydroxyphenyl)propionate methane from Ciba-Geigy; a stabilizer |
| Irganox 1076 | octadecyl 3-(3,5-di-tert-butyl-4-hydroxyphenyl)propionate methane from Ciba-Geigy; a stabilizer |
| PE-1 | low density polyethylene (MI 1.2 g/10 min, 0.922 g/cm$^3$) known as L-411 available from Statoil |

-continued
LIST OF MATERIALS USED

| Material Name | Description |
| --- | --- |
| PE-2 | low density polyethylene (0.922 g/cm$^3$, MI 1.8 g/10 min) known as L-420 available from Statoil |
| PE-3 | a high density polyethylene (0.953 g/cm$^3$, MI 6.5 g/10 min (190° C., 2.16 kg)) known as Lupolen 5031-L available from BASF |
| PE-4 | a linear low density polyethylene (octene comonomer, 0.939 g/cm$^3$, MI 6.5 g/10 min (190° C., 2.16 kg)) known as Dowlex 2037E available from Dow Chemical |
| PE-5 | a linear low density polyethylene (octene comonomer, 0.909 g/cm$^3$, MI 8 g/10 min) known as Dowlex 3360E available from Dow Chemical |
| Naugard 445 | 4,4'-bis($\alpha,\alpha$-dimethyl-benzyl) diphenylamine from Uniroyal; a stabilizer |
| Naugard XL-1 | 2,2'-oxamidobis[ethyl-3-(3,5-di-tert-butyl-4-hydroxyphenyl)-propionate; a stabilizer |
| Trigonox 101 | 2,5-dimethyl-2,5-di(tert-butyl-peroxy)hexane from Akzo |
| Porous Polymer A | porous LDPE known as Accurel available from Akzo Enka AG (Enka Industrial Products, Inc., Accurel System Group) |
| Porous Polymer B | porous HDPE known as Accurel available from Akzo Enka AG (Enka Industrial Products, Inc., Accurel Systems Group) |

TEST METHODS

The following test methods were used in the Examples:

| | |
| --- | --- |
| Tensile Strength | ASTM D638 |
| Elongation (at break) | ASTM D638 |
| Gel Content | ASTM D2765 |
| Hot set | IEC 540 (82) Art. 14 after 15 min. at 200° C., 20 N/cm$^2$ load |
| Permanent Elongation | after recovery for 5 min. at 200° C. from Hot Set test |

The following examples illustrate the present invention.

EXAMPLE 1

Preparation of Compounds C, I, J, K, N

The vinylsilane and the other ingredients except the carrier polymer were combined and stirred at room temperature in a closed, dry glass or stainless steel vessel until a homogeneous solution in the vinylsilane was obtained. The carrier polymer, in pellet form, was placed in a dry, sealable cylinderical drum, filling the drum to about three-quarters of its capacity. The liquid silane mixture was added and the drum was sealed. The drum was rotated at ambient temperature on motorized rubber rollers for 25-30 minutes, after which the liquid was completely absorbed in the carrier polymer. The pellets so obtained were stored in a dry atmosphere in a sealed container prior to use.

EXAMPLE 2

Preparation of Compound L

The same procedure as described in Example 1 was followed, except that EVA Pellets were substituted for the carrier polymer pellets, and the blending time necessary for complete absorption of the liquid was 2-3 hours.

EXAMPLE 3

Preparation of Compound M

Pellets of polyethylene (99 parts) and DBTDL (1 part) were placed in a dry, sealed cylindrical container. The drum was rotated on mechanically rotated rollers in an oven at 80° C. for one hour, after which time the DBTDL was fully absorbed in the polyethylene pellets.

EXAMPLE 4

LDPE pellets were placed in a sealed 4-liter cylindrical drum together with the amount of Compound A indicated in Table 1, column 1 and 2. The drum was rotated on mechanically driven rollers at room temperature for 1-2 minutes. At the end of this time, Compound A had uniformly coated the surface of the polyethylene pellets, but the pellets still appeared wet. This procedure simulates uniform spraying of Compound A into the throat of an extruder in a larger scale operation.

The silane-coated polyethylene pellets were extruded using a 36 mm 24/1 K/D Leistritz extruder at a melt temperature of 210° C., through a 50 mm×1 mm slit die, to form a tape. The tape was immersed in hot water for 4 hours at 90° C. Physical properties were obtained as shown in Table 1, Columns 1 and 2.

EXAMPLE 5

Pellets of Polyethylene PE-1 and Compound N were tumble-blended in the ratio shown in Table 1, Columns 5 and 6. The physical mixture was formed into tape and crosslinked using the same conditions as in Example 4. The physical properties shown in Table 1, Columns 5 and 6, were obtained.

The amounts of silane, polymer, peroxide and catalyst employed in Examples 4 and 5 were identical. The physical properties obtained with Compound N were superior and the extruder output was superior to those obtained with the liquid/solid blend of Column 1. The falloff of rate seen in Column 2 is commonplace when liquid silanes are used at high levels with polyethylene pellets in short extruders and was eliminated by the use of the present invention.

EXAMPLE 6

Mixtures of polyethylene and EVA pellets were coated with Compound A in the ratios shown in Table 1, Columns 3 and 4, using the method of Example 4. The mixtures were extruded into tape and crosslinked as in Example 4. The physical properties shown in Table 1, Columns 3 and 4, were obtained. cl EXAMPLE 7

Pellets of polyethylene, silane and peroxide absorbed in EVA, and hydrolysis/condensation catalyst absorbed in polyethylene were tumble-blended in the ratios shown in Table 1, Columns 7 and 8. The mixture was extruded into tape and crosslinked as in Example 5. The physical properties shown in Table 1, Columns 7 and 8, were obtained.

The relative amounts of polyethylene, EVA, silane, peroxide, and hydrolysis/condensation catalyst employed in Examples 6 and 7 were identical. The physical properties shown in Table 1 showed improvements when the solid form of the silane/peroxide mixture was used.

EXAMPLE 8

Sleeves were extruded using an extruder and die intended for extruding jacketing onto electrical cable, as shown in Table 2. After crosslinking by immersion in 90°-95° C. water for four hours, the hot set value of 80% indicated that a satisfactory level of crosslinking had been achieved.

EXAMPLE 9

High density polyethylene pipe was extruded using the equipment described in Table 3. The gel content values (obtained after immersion in 90°-95° C. water) showed that a satisfactory level of crosslinking had taken place.

EXAMPLE 10

Power cable insulation was extruded using the equipment and conditions described in Table 4. The change in physical properties after exposure to water demonstrates that satisfactory crosslinking was obtained using the present invention.

TABLE 1

Evaluation of Compositions

EQUIPMENT
Leistriz Extruder (36 mm diameter, 24/1 length/diameter)
Screw design: Type B (barrier screw)
Die: 50 mm × 1 mm slit
Temperature Profile (°C.): 170 (feed)/190/210/210/210 (die)

|  | Comparative Composition | | | | Composition of the Present Invention | | | |
|---|---|---|---|---|---|---|---|---|
|  | 1 | 2 | 3 | 4 | 5 | 6 | 7 | 8 |
| INGREDIENTS | | | | | | | | |
| PE-1 | 98.80 | 98.60 | 94.14 | 93.17 | 98.00 | 97.70 | 90.58 | 89.01 |
| Compound N | — | — | — | — | 2.00 | 2.30 | — | — |
| Compound A | 1.20 | 2.40 | 1.20 | 1.40 | — | — | — | — |
| Compound L | — | — | — | — | — | — | 5.82 | 6.79 |
| EVA-1 | — | — | 4.66 | 5.43 | — | — | — | — |
| Compound M | — | — | — | — | — | — | 3.60 | 4.20 |
| PHYSICAL PROPERTIES* | | | | | | | | |
| Tensile Strength, (MPa) | 14.8 | 17.3 | 16 | 15.7 | 17.2 | 16.5 | 17.7 | 17.3 |
| Elongation, (%) | 598 | 667 | 602 | 623 | 865 | 756 | 790 | 619 |
| Hot-Set, (%) | 75 | 60 | 100 | 65 | 70 | 55 | 100 | 50 |
| Output Extruder (kg/hr)** | 4.31 | 3.63 | 4.63 | 4.52 | 4.57 | 4.72 | 4.69 | 4.46 |

*4 hours crosslinking in water at 90° C.
**after 20 minutes of extrusion, at 20 rpm

TABLE 2

Evaluation of Low-Density Polyethylene Sleeves on a Cable Extruder for Crosslinking EQUIPMENT
Troester Extruder (90 mm diameter, 25/1 length/diameter)
Spiral grooved for 1.5 mm diameters
Screw design: TS-IA 9040/87 PVC
Head: Transverse with 2 screens 250/600 mesh and breaker plate
Die: 30.2 mm
Nozzle: 27.5 mm
Temperature Profile (°C.): 160/170/180/190/200/200/190/210/210
Cooling temperature of the feeding zone (°C.): 50
INGREDIENTS
PE-2                                100%
Compound I                          3.3%
Composition Number                    9
RUN CONDITIONS
Screw Speed, rpm                     20

TABLE 2-continued

Evaluation of Low-Density Polyethylene Sleeves on a Cable Extruder for Crosslinking

| Motor Power, kw | 4.4 |
|---|---|
| Output of Crosslinkable Polyethylene, kg/hr | 36.5 |
| Melt Temperature, °C. | 209 |
| TEST RESULTS* | |
| Hot Set Elongation/permanent, (%) | 80/0 |
| Tensile Strength (MPa) | 16.4 |
| Elongation, (%) | 623 |

*after 4 hours crosslinking in water at 90-95° C.

TABLE 3

Evaluation of Crosslinked High Density Polyethylene Pipes

EQUIPMENT
Troester Extruder (60 mm diameter, 25/1 length diameter)
Spiral grooved for 1.5 diameters
Screw Design: TS-1A 90029
Head: Cross head for pipe
Die: 22.5 mm
Nozzle: 16.4 mm
Temperature Profile (°C.): 175 (feed)/185/190/210/210/210 (head)

| Composition Number | $10^1$ | $11^2$ | $12^3$ |
|---|---|---|---|
| INGREDIENTS (wt. %) | | | |
| PE-3 | 100.0 | | |
| Compound C | 3.7 | | |
| PE-4 | | 97.0 | 97.0 |
| Compound H | | 3.0 | 3.0 |
| Compound K | | 2.5 | 3.7 |

| Composition No. | Screw Speed (rpm) | Output (kg/hr) | Motor Current A | Gel Content* | Remarks |
|---|---|---|---|---|---|
| 10 | 25 | 19.0 | 12 | | Excellent surface |
|  | 50 | 35.5 | 16 | | |
|  | 75 | 51.0 | 16 | | |
|  | 30 | — | 11 | 68.0 | |
| 11 | 25 | 18.0 | 14 | | Excellent surface |
|  | 50 | 34.5 | 20 | | |
|  | 75 | 50.0 | 22.5 | | |
|  | 28 | — | 15 | 75.3 | |
| 12 | 25 | 16.0 | 11 | | Excellent surface |
|  | 50 | 32.5 | 15 | | |
|  | 75 | 41.5 | 17 | | |

TABLE 3-continued

Evaluation of Crosslinked High Density Polyethylene Pipes

| | | | |
|---|---|---|---|
| 30 | — | 12.5 | 76.9 |

[1] polyethylene sanitary pipe formulation.
[2] polyethylene pipe formulation.
[3] polyethylene cable insulation.
* after immersion in water at 95° C. for 6 hr.

TABLE 4

Evaluation of Extrusion of Low Voltage Power Cable Insulation

EQUIPMENT

PVC Extruder (120 mm diameter by 24/1 length/diameter) Rosendahl (Austria)
Screw design: PVC screw: BM Type
Compression ratio: 2/1
Extrusion head/die: tube on
Breaker plate plus screen: (3 × 40 mesh)

RESULTS

| Composition No. | Compound J* (wt %) | Line Speed (m/min) | Temperature** Profile | Tensile Strength (Mpa) | Elongation at Break (%) | Hot Set Permanent (%) |
|---|---|---|---|---|---|---|
| 13[a] | 0 | 18 | (1) | 12.9 | 453 | — |
| 14[a] | 2.4 | 18 | (1) | 12.1 | 435 | — |
| 15[a] | 2.4 | 52 | (2) | 12.0 | 478 | — |
| 16[a] | 2.7 | 18 | (2) | 12.5 | 413 | — |
| 17[a] | 3.0 | 18 | (2) | 12.6 | 428 | — |
| 18[b] | 2.4 | 18 | (1) | 14.1 | 400 | 80/0 |
| 19[b] | 2.4 | 18 | (2) | 12.8 | 263 | 40/0 |
| 20[b] | 2.7 | 52 | (2) | 15.7 | 385 | 50/0 |
| 21[b] | 3.0 | 18 | (2) | 14.1 | 392 | 45/0 |

*dry blended with LDPE (MI = 3) in cement mixer for five minutes; air-conveyed to extruder hoper
**(1) 120/140/160/180/180-180° C.
   (2) 120/140/170/190/200-200° C.
[a] measurements made directly after extrusion
[b] measurements made after crosslinking for 8 hours at 90° C. in water

What is claimed is:

1. A process for producing a polymer crosslinkable by exposure to moisture in the presence of a hydrolysis/condensation catalyst comprising:
   (a) blending
      (i) a thermoplastic base polymer selected from the group consisting of a homopolymer of an alpha-olefin having 2-6 carbon atoms, a copolymer of two alpha-olefins, a copolymer of ethylene and vinyl acetate, a copolymer of ethylene and ethyl acrylate, a copolymer of ethylene and acrylic acid, and mixtures of an ethylene vinyl acetate copolymer, ethylene ethyl acrylate copolymer, or ethylene acrylic acid copolymer with each other or with copolymers of ethylene and 1-butene, 1-hexene, 1-octene, or 4-methyl-1-pentene.
      (ii) a solid carrier polymer substantially free of water having contained therein a silane having the formula

wherein R' represents a hydrogen or a methyl group; x and y are 0 or 1, with the proviso that when x is 1, y equals 1; n is an integer from 1 to 12 inclusive; each R independently represents a hydrolyzable organic group selected from the group consisting of alkoxy, aryloxy, aralkoxy, aliphatic acyloxy, oximo, alkylamino and arylamino, or a lower alkyl group having from 1 to 6 carbon atoms inclusive, with the proviso that no more than one of the three R groups is an alkyl; and
      (iii) a free radical generator;
   (b) heating and mixing (i), (ii) and (iii) together at a temperature above the crystalline melting point of said base polymer.

2. A process according to claim 1 wherein said base polymer is selected from the group consisting of copolymers of ethylene, propylene, 1-butene, 1-pentene, 1-hexene, 1-octene, isobutylene, 2-methyl-1-butene, 3-methyl-1-pentene, 4-methyl-1-pentene, 2,3-dimethyl-1-butene, 3,3-dimethyl-1-butene, 2-ethyl-1-butene, and mixtures thereof.

3. A process according to claim 1 wherein said base polymer is polyethylene or a copolymer of ethylene with 1-butene, 1-hexene, 1-octene, or 4-methyl-1-pentene.

4. A process according to claim 1 wherein said carrier polymer is compatible with said base polymer and said silane.

5. A process according to claim 1 wherein said carrier polymer is a porous polymer.

6. A process according to claim 5 wherein said porous polymer is selected from the group consisting of high density polyethylene, low density polyethylene and linear low density polyethylene.

7. A process according to claim 6 wherein said porous polymer has a pore volume from about 30 to about 90 percent.

8. A process according to claim 6 wherein said porous polymer is in pellet form.

9. A process according to claim 1 wherein the amount of said carrier polymer ranges from about 0.1 to about 20 weight percent.

10. A process according to claim 9 wherein the amount of said carrier polymer ranges from about 0.7 to about 7 weight percent.

11. A process according to claim 1 wherein said carrier polymer encapsulates said silane.

12. A process according to claim 1 wherein said carrier polymer is readily swelled by said silane.

13. A process according to claim 12 wherein said carrier polymer is ethylene vinyl acetate copolymer.

14. A process according to claim 1 wherein said silane is selected from the group consisting of vinyltriethoxysilane, vinyltrimethoxysilane, vinyltri-iso-butoxysilane.

15. A process according to claim 1 wherein said silane is present in an amount ranging from about 0.1 to about 20 weight percent based on the weight of the product.

16. A process according to claim 15 wherein said silane is present in an amount ranging from about 0.7 to about 7 weight percent based on the weight of the product.

17. A process according to claim 1 wherein said free radical generator is selected from the group consisting of dicumyl peroxide and α,α'-bis(tertiary-butylperoxy)-di-isopropylbenzene.

18. A process according to claim 17 wherein said free radical generator is present in an amount ranging from about 0.4 weight percent to about 0.4 weight percent based on the total weight of the product.

19. A process according to claim 1 wherein said hydrolysis/condensation catalyst are selected from the group consisting of dibutyltin dilaurate, dioctyltin dilaurate, and stannous octonoate.

20. A process according to claim 19 wherein said hydrolysis/condensation catalyst is present in an amount ranging from about 0.01 to 0.2 weight percent based on the total weight of product.

21. A process according to claim 1 wherein said carrier polymer contains said silane and a free radical generator.

22. A process according to claim 21 wherein said carrier polymer contains other additives.

23. A process according to claim 22 wherein said carrier polymer contains a hydrolysis/condensation catalyst.

24. A crosslinked polymer product prepared accordance with the process of claim 23.

25. A crosslinked polymer product prepared accordance with the process of claim 6.

26. A crosslinked polymer product prepared accordance with the process of claim 22.

27. A crosslinked polymer product prepared in accordance with the process of claim 23.

28. A process for producing a polymer crosslinkable by exposure to moisture in the presence of a hydrolysis/condensation catalyst comprising:
   (a) blending
      (i) a polyolefin polymer;
      (ii) a porous polymer compatible with said polyolefin and selected from the group consisting of high density polyethylene, low density polyethylene and linear low density polyethylene and wherein said porous polymer has a pore volume from about 30 to about 90 percent, a pore cross-section ranging from about 0.1 to about 5μm, and a pore cell size ranging from about 1 to about 30μm; said porous polymer having contained therein a vinylalkoxysilane; and
      (iii) a free radical generator;
   (b) heating and mixing (i), (ii) and (iii) together at a temperature above the crystalline melting point of said base polyolefin.

29. A process for producing crosslinked polymer comprising:
   (a) blending
      (i) a polyolefin polymer;
      (ii) a Porous polymer compatible with said polyolefin selected from the group consisting of high density polyethylene, low density polyethylene and linear low density polyethylene and wherein said porous polymer has a pore volume from about 30 to about 90 percent, a pore cross-section ranging from about 0.1 to about 5μm, and a pore cell size ranging from about .1 to about 30μm; said porous polymer having contained therein a vinylalkoxysilane; and
      (iii) a free radical generator;
   (b) heating and mixing (i), (ii) and (iii) together at a temperature above the crystalline melting point of said polyolefin polymer.
   (c) exposing the mixture of (b) to a hydrolysis/condensation catalysts and water.

* * * * *